United States Patent [19]

Pepper et al.

[11] Patent Number: 5,098,730

[45] Date of Patent: Mar. 24, 1992

[54] DIETETIC SWEETENING COMPOSITION

[75] Inventors: Tammy Pepper, Twickenham, United Kingdom; Philip M. Olinger, St. Charles, Ill.

[73] Assignee: Cultor Ltd., Helsinki, Finland

[21] Appl. No.: 272,187

[22] Filed: Nov. 14, 1988

[51] Int. Cl.⁵ .................. A23G 3/00; A23L 1/307; A23L 1/308

[52] U.S. Cl. .................. 426/548; 426/660; 426/804; 426/658

[58] Field of Search .............. 426/548, 660, 658, 804

[56] References Cited

U.S. PATENT DOCUMENTS

| | | | |
|---|---|---|---|
| 3,914,434 | 10/1975 | Bohni | 426/213 |
| 4,122,205 | 10/1978 | Burge et al. | 426/548 |
| 4,254,154 | 3/1981 | Eisenstadt | 426/548 |
| 4,292,337 | 9/1981 | Andersen | 426/573 |
| 4,528,206 | 7/1985 | Kastin | 426/804 |
| 4,556,565 | 12/1985 | Arima et al. | 426/548 |
| 4,574,091 | 3/1986 | Steensen | 426/548 |
| 4,622,233 | 11/1986 | Torres | 426/548 |
| 4,631,195 | 12/1986 | Colliopoulos | 426/548 |
| 4,698,232 | 10/1987 | Sheu et al. | 426/548 |

FOREIGN PATENT DOCUMENTS 1526020  9/1978  United Kingdom .

Primary Examiner—Jeanette Hunter
Attorney, Agent, or Firm—Baker & McKenzie

[57] ABSTRACT

A reduced calorie, noncarcinogenic sweetener of xylitol and a reduced calorie bulking agent in a weight ratio of about 4 to about 0.05 based on the dry weight thereof. The sweetener enables the preparation of cooked confections which also retain their stability after processing.

12 Claims, No Drawings

DIETETIC SWEETENING COMPOSITION

TECHNICAL FIELD

This invention relates to a dietetic sweetening composition. The principal ingredients of the dietetic sweetening composition are xylitol and a reduced calorie bulking agent. The sweetening composition can also include an additional polyhydric alcohol or alcohols and/or an intense sweetener. In a method aspect, the invention relates to a method for producing a shelf stable chewy candy sweetened by xylitol in combination with a reduced calorie bulking agent. A second method aspect relates to a method for producing cooked hard candy sweetened with xylitol and an intense sweetener in combination with a reduced calorie bulking agent.

BACKGROUND OF THE INVENTION

Sugar, or sucrose, is probably the most important ingredient in the confectionery industry. Sucrose is used to provide both the sweetness and the body in confectionery products and its properties also govern the textural attributes of such products. Although a wide variety of alternative sweeteners are commercially available, it is generally considered that sucrose is the optimum sweetener with regard to taste profile and technological properties. However, sucrose has been implicated as a contributory factor in many diseases, including hypertension, coronary heart disease, arterial sclerosis and dental caries. These health concerns have led health care professionals to analyze the effects of sucrose and its prominent role in the diet.

Perhaps the most significant, well-documented effect of sucrose is its contribution to tooth decay. The mouth contains a number of bacterial strains, principally *Streptococcus mutans*, which ferment common dietary carbohydrates such as sucrose. This fermentation generates acid as an end product which lowers the pH in the mouth; the lowered pH leads to a demineralization of tooth enamel and finally to the formation of dental lesions or caries.

The presence of sucrose and other fermentable carbohydrates in regular meals is not the principal cause of tooth decay; the consumption of between meal snacks which contain high concentrations of sucrose, such as confections, has been shown to have a close relationship to the formation of dental caries. Long after the confection has been consumed, sucrose stays in the mouth and is fermented by *S. mutans* and other bacteria, lowering the mouth pH and promoting dental caries as described above.

One approach to fighting dental caries is to reduce or eliminate the amount of fermentable carbohydrates such as sucrose in confections and other snacks. The replacement of fermentable carbohydrates by sugar substitutes which cannot be fermented, or are less easily fermented by *S. mutans* and other bacteria has been shown to decrease the development of dental caries.

The quest for adequate sugar substitutes in this context has not, to date, been completely successful. Generally speaking, confections can be made using sugar substitutes but sugar substitutes do not often provide the same desirable taste and textural qualities that sucrose does. Most sugar substitutes, such as "bulk" sweeteners like sorbitol, mannitol, isomalt, lactitol, maltitol and hydrogenated glucose syrup are not as sweet as sugar and unless combined with other sweeteners, do not provide sufficient sweetness and/or acceptable taste. Confections made with sugar substitutes may be sweetened (in whole or in part) with intense artificial sweeteners such as dipeptide sweeteners (including aspartame), acesulfame K, saccharin and cyclamates. Intense sweeteners have at least two drawbacks: although they are far sweeter than sucrose and sugar substitutes, they often impart an unpleasant aftertaste and they do not contribute any of the body or bulk necessary for an acceptable product.

Xylitol has been used as a sugar substitute in certain contexts, including chewing gum. For example, U.S. Pat. No. 4,514,422 (Yang) and 3,422,184 (Patel) disclose the use of xylitol (as well as other sugar alcohols) in sugar-free chewing gums. To date, however, xylitol has not been effectively and commercially utilized to sweeten cooked, reduced calorie or "lite" confectionery products such as hard candies, chewy candies and gelatin jelly candies. In these contexts, xylitol, because of certain characteristics such as its low viscosity and unique crystallization properties, has been difficult to integrate into a shelf stable, acceptable tasting product which can be efficiently and practically produced on a commercial scale. In addition, although xylitol has been used to sweeten full calorie chocolate confections, in this context, xylitol exhibits an unpleasant "burning" aftertaste. Finally, because xylitol has the same caloric value as sugar its use in dietary products with reduced calories has been limited. The Federal Drug Administration has defined a "reduced calorie" food as one which has at least one third less calories than standard food products.

Our invention, however, provides for a sweetening composition which includes xylitol which is particularly suitable for use in hard candies, chewy candies, gelatin jelly candies and other applications such as chocolate confections and praline or fondants. Because of xylitol's low viscosity, certain confections utilizing it are subject to cold flow and are often unstable within a few days of production. The present invention utilizes a combination of xylitol and a reduced calorie bulking agent which unexpectedly results in a shelf stable product which is not subject to cold flow. The present invention can also include an additional polyhydric alcohol and/or an intense sweetener if necessary to add needed sweetness.

Further, it has also been unexpectedly discovered that the use of xylitol per se in some contexts as a sweetener imparts sufficient sweetness even when it is not substituted for sugar in a one-to-one ratio. Hence, in combination with a reduced calorie bulking agent, the present invention comprises a dietetic sweetening composition with reduced calories in the absence of any intense sweetener, a product not thought possible in view of the caloric equivalence of sucrose and xylitol.

Confections sweetened with xylitol are particularly desirable because of the known advantages of xylitol. Xylitol is a naturally occurring five carbon sugar alcohol which has the same sweetness and caloric content of sugar (4 kilocalories per gram). Xylitol is found in small amounts in many fruits and vegetables and is produced in the human body during normal metabolism. Xylitol is particularly attractive because of its known metabolic, dental and technical characteristics.

From a metabolic perspective, xylitol is metabolized largely independent of insulin, so it can be safely consumed by non-insulin dependent diabetics. Further, xylitol has been shown to delay gastric emptying and to possibly suppress food intake which means it may have an important role in weight reducing diets.

A significant advantage of xylitol is that it is not fermented by *S. mutans* and other bacteria found in the mouth and, therefore, does not produce acids which, as described herein, contribute to the formation of dental caries. Xylitol is well established as a non-cariogenic substance, i.e. xylitol does not contribute to caries formation. Significant data also exists which supports the view that xylitol is not only non-cariogenic, but actively suppresses the formation of new caries and may even reverse existing lesions by inducing remineralization, i.e. it is a cariostatic material. A summary of clinical data regarding the effects of xylitol and its possible mechanisms is set forth in Bar, Albert, *Caries Prevention With Xylitol: A Review of the Scientific Evidence.* 55 Wld. Rev. Nutr. Diet. 183-209 (1983). The mechanism or mechanisms by which xylitol effects any cariostatic properties is not yet known, but some possible mechanisms which have been suggested include a reduction of oral levels of *S. mutans,* a lack of contribution to the growth of plaque bacteria, the stimulation of the flow of protective saliva, the favorable alteration of the composition of saliva, the retardation of demineralization and an enhancement of remineralization of tooth enamel.

Xylitol also has significant technological advantages, particularly with respect to taste profile. Xylitol produces a pleasant cooling effect in the mouth when consumed in the crystalline state. The energy required to dissolve one gram of xylitol is 34.8 calories, the highest known value for sugars and sugar alcohols; this produces a physical cooling effect which is desirable in many contexts. Xylitol is as sweet as sugar and does not typically manifest unpleasant aftertastes.

The present invention also discloses a novel method for producing a shelf stable, reduced calorie sugar free chewy candy which contains xylitol. The method, in which a candy mass is allowed to sit for a period of about 12 hours (e.g. overnight) and then worked by means of a high speed mixer or suitable expedient to disrupt the crystalline structure, permits higher quantities of xylitol fondant to be utilized without a reduction in stability.

In a further method aspect, xylitol is used to regulate the viscosity in cooked hard candy masses to allow the inclusion and homogenous dispersion of an intense sweetener. Reduced calorie bulking agents—such as polymers of glucose and maltose—are known to create a mass of such viscosity when boiled that intense sweeteners cannot be adequately added and dispersed throughout the mass. Xylitol acts to lower the viscosity of the mass—to an extent greater than that predicted theoretically—to the point where an intense sweetener can be added and dispersed. Although some of the polyols may have a similar effect, they are not as effective as xylitol and do not have the sweetness or crystallization properties of xylitol.

SUMMARY OF THE INVENTION

The present invention contemplates a dietetic sweetening composition comprising xylitol and a reduced calorie bulking agent in a respective weight ratio of about 4 to about 0.05. The preferred reduced calorie bulking agent is a polymer of glucose or maltose with a randomly bonded condensation polymer of dextrose being particularly preferred. Other suitable bulking agents include polymers of fructose or plant fibers, including cocoa fiber, oat fiber, wheat fiber, sugar beet fiber or corn fiber.

The sweetening composition of the present invention may also include an intense sweetener. The intense sweeteners of choice are dipeptide sweeteners, with aspartame being particularly preferred. In a particularly preferred embodiment, the xylitol and aspartame are present in a respective weight ratio of about 85 to about 225 based on dry weights thereof.

The sweetening composition of the present invention may also include an additional physiologically acceptable polyhydric alcohol, such as isomalt, maltitol, hydrogenated glucose syrup, sorbitol and mannitol. Hydrogenated glucose syrup is particularly preferred.

The present invention also contemplates reduced calorie or "lite" compositions including a sugar free hard candy composition, a sugar free chewy candy composition, a sugar free gelatin jelly composition, a sugar free praline and a sugar free chocolate, all sweetened with xylitol in combination with a reduced calorie bulking agent, preferably a randomly bonded condensation polymer of dextrose. These sweetening compositions may also include an intense sweetener, preferably aspartame, and/or an additional physiologically acceptable polyhydric alcohol, preferably hydrogenated glucose syrup.

In a method aspect, the present invention provides a means for preparing a shelf stable, sugar free chewy candy sweetened with xylitol. An aqueous solution of xylitol and a reduced calorie bulking agent are combined with vegetable fat and an emulsifier, heated to form a free flowing syrup and maintained at an elevated temperature to achieve the desired solids level. The resulting mass is cooled and combined with gelatin to form a gel and then further cooled. The mass is thereafter worked for a period of time to disrupt the crystalline structure of the mass. The resulting chewy candy exhibits increased shelf stability and improved texture.

Detailed Description of the Preferred Embodiment

A. General

The principal ingredients of the present invention are xylitol and a reduced calorie bulking agent. The sweetening composition which contains these ingredients is suitable for such reduced calorie, sugar free confections as boiled hard candies, chewy candies, gelatin jelly candies, chocolate and fondants.

The use of xylitol as the sole source of sweetness in these contexts has not been particularly successful for a variety of reasons. Xylitol, as noted, has a relatively low viscosity so certain confection products sweetened solely with xylitol tend to exhibit cold flow and are unstable after several days of storage. Further, the caloric content of xylitol is equal to that of sugar, so a product sweetened solely with xylitol cannot be considered "dietetic" insofar as it does not have reduced levels of calories compared to standard confections. Finally, a noticeable, unpleasant "burning" aftertaste is perceived in chocolate confections sweetened solely with xylitol.

By using xylitol in combination with a reduced calorie bulking agent, these problems can be overcome. The bulking agent adds sufficient viscosity to the confection products to reduce or eliminate cold flow, giving the products sufficient shelf stability. Common bulking agents, including hexitols and polyols in general have the same caloric value as sugar and hence do not contribute to a "reduced calorie" food product as defined by the FDA. In this context, a reduced calorie bulking agent is one having a caloric content less than sucrose (about 4 calories per gram) and preferably no more than about 1 calorie per gram. The bulking agent can be water soluble or water insoluble. Polymers of glucose or maltose with lower caloric content are suitable including those disclosed in U.S. Pat. Nos. 3,766,165; 3,876,794 and 4,622,233. These references also disclose suitable methods for preparing such polymers and are incorporated herein by reference. These polymers include water soluble, randomly bonded condensation polymers of dextrose commonly used as bulking agents. One particularly preferred polymer type is available under the designation POLYDEXTROSE from Pfizer, Inc. (U.S.A.). Other suitable reduced calorie bulking agents include mixtures of fructose polymers (such as those sold under the designation Neosugar) and soluble or insoluble dietary fiber including oat fiber, cocoa fiber, wheat fiber, sugar beet fiber or corn fiber.

In certain contexts, the xylitol and the reduced calorie bulking agent may not provide sufficient sweetness. In such instances, other bulk sweetening agents, including other polyhydric alcohols such as maltitol, hydrogenated glucose syrup, sorbitol and mannitol can be included in order to impart the desired sweetness. The preferred polyhydric alcohol in this context is hydrogenated glucose syrup. In addition, intense sweeteners such as dipeptide sweeteners (particularly aspartame), acesulfame K, saccharin and cyclamates can be used to add additional sweetness when desired.

Confections made with the sweetening compositions of the present invention are sugar free and, due to the presence of xylitol, have metabolic and dietary advantages vis-a-vis conventional confections. As noted, the non-cariogenic, and perhaps cariostatic effects of xylitol are present in the confections of the present invention. The confections are sufficiently sweet, exhibit acceptable texture, and are generally shelf stable.

The method aspect of the present invention provides for a method for producing a shelf stable chewy candy. The chewy candy is prepared pursuant to well-known methods but after cooling and attendant crystallization of the sugar alcohol and alcohols present, the crystalline structure of the candy is disrupted by working the mass, for example with a heavy duty mixer or by otherwise working the mass by similar expedients. More particularly, the method comprises combining an aqueous solution of xylitol and a reduced calorie bulking agent with vegetable fat and an emulsifier, e.g. glycerol monosterate. The resulting combination is heated to an elevated temperature sufficient to form a free-flowing syrup for a time period sufficient to achieve the desired solid levels; a temperature of about 165° C. is preferred. The heating drives off moisture and the resulting mass must contain solids with a weight percent sufficient to allow the mass to be handled effectively and which will produce a chewy candy with acceptable texture. The mass is then cooled to a temperature of below about 150° C. but above 80° C. (preferably about 140° C.) and combined with an aqueous gelatin solution to produce a gelled mass; the resulting gelled mass is further cooled to a temperature of below about 30° C. but above 5° C. (preferably about 25° C.). The further cooled mass is worked for a time period sufficient to reduce the degree of crystallizing. The resulting mass is next kneaded into open ropes and cut. The disruption of the crystalline structure prevents hardening of the candy and allows a greater concentration of xylitol fondant to be used without adversely affecting texture and stability.

The presence of xylitol lowers the viscosity of the confection which makes the product easier to handle and surprisingly, xylitol reduced the viscosity of confectionery mixes far more than would be expected based on theoretical calculations. The lowered viscosity allows for the addition of an intense sweetener, such as aspartame, because the lowered viscosity permits uniform distribution of the intense sweetener during mixing. As noted earlier, reduced calorie bulking agents such as polymers of glucose or maltose (including Polydextrose K and Polydextrose A) create a highly viscous mass when boiled. Such a mass is so viscous that it is almost impossible to mix in an intense sweetener and obtain a homogenous blend. The use of xylitol acts to lower the viscosity so that an intense sweetener can be blended into the mass. Nevertheless, the combination of xylitol and the bulking agent results in a shelf stable product. The instant invention further provides for a method of preparing a stable, sugar free, reduced calorie hard candy by dissolving xylitol and a reduced calorie bulking agent in a weight ratio of less than about 1:4 in water, and heating the resulting solution for a time period sufficient to achieve a mass comprising about 99.5% to about 96.5% dry substance. The resulting mass is cooled, but is sufficiently viscous so that an intense sweetener can be worked in and substantially uniformly dispersed.

B. Experimental

1. Sugar-Free Hard Candies

Table I set forth below includes data for various sugar-free boiled hard candies with various formulations. Each formulation was prepared by dissolving xylitol, a reduced calorie bulking agent (Polydextrose K or hydrogenated glucose syrup) in water. The resulting mixture was heated to a temperature of about 145° C. to about 157° C. with boiling of the mass continued to about 99.5% to about 96.5% dry substance. This step was, in some examples, done under vacuum pursuant to methods well known in the art. Coloring, flavors, acidulants and, where desired, an intense sweetener were added to the mass after cooling it to about 140° C. The resulting cooled mass was then rolled or deposited pursuant to methods well known in the art.

TABLE I

| | SUGAR-FREE HARD CANDIES | | | | | | | | |
|---|---|---|---|---|---|---|---|---|---|
| | Candy No. | | | | | | | | |
| | 1 | 2 | 3 | 4(a) | 4(b) | 5 | 6 | 7 | 8 |
| | % (By Weight) | | | | | | | | |
| Xylitol | 78.0 | — | — | 15.3 | 15.3 | 25.6 | 15.3 | 25.6 | 15.5 |
| Polydextrose A | — | 78.0 | — | 61.4 | 61.4 | 51.1 | 61.4 | 51.1 | 34.2 |
| Hydrogenated glucose syrup | — | — | 99.7 | — | — | — | — | — | 37.3 |
| Citric acid | 0.3 | 0.3 | 0.3 | 0.3 | 0.3 | 0.3 | 0.3 | 0.3 | 0.3 |
| Flavor/Color | qs | qs | qs | qs | qs | qs | qs | qs | qs |

TABLE I-continued

| SUGAR-FREE HARD CANDIES | | | | | | | | | |
|---|---|---|---|---|---|---|---|---|---|
| | Candy No. | | | | | | | | |
| | 1 | 2 | 3 | 4(a) | 4(b) | 5 | 6 | 7 | 8 |
| | % (By Weight) | | | | | | | | |
| Aspartame | — | — | — | — | — | — | 0.35 | 0.3 | — |
| Water | 21.7 | 21.7 | — | 23.0 | 23.0 | 23.0 | 22.65 | 22.7 | 12.7 |
| Boiling Temperature (°C.) | 157$^v$ | 145$^a$ | 157$^v$ | 157$^v$ | 150$^a$ | 157$^v$ | 150$^a$ | 157$^v$ | 157$^v$ |
| Dry substance (%) | 99.5 | 96.2 | 99.5 | 99.3 | 96.4 | 99.3 | 96.4 | 99.3 | 99.5 |
| Viscosity at 140° C. (MPas) | 74.0 | * | 48000 | 80000 | 5200 | 11000 | 5200 | 11000 | 24000 |
| Sweetness | + | — | — | — | — | — | + | + | + |
| Stability | — | + | — | + | + | ± | + | ± | + |

Key
+ - Sufficient
− - Insufficient
$^a$Atmospheric pressure
$^v$Vacuum
* - too viscous to measure
qs - quantum sufficit Candy No. 1 was sweetened solely with xylitol and although it was perceived to have sufficient sweetness, it was unstable and did not harden sufficiently because of the low viscosity of the composition. Candy No. 2, containing only Polydextrose A was perceived to be insufficiently sweet and although stable, was far too viscous and lacked clarity because of entrapped air bubbles. Candy No. 3, sweetened solely with hydrogenated glucose syrup was perceived to be insufficiently sweet and lacked stability, i.e. it had a noted tendency toward hygroscopicity and was prone to cold flow.

Candy No. 4(a), sweetened with xylitol in combination with Polydextrose A in a ratio of about 1:4 produced a very high viscosity mass when boiled to 157° C. under vacuum to a mass comprising 99.3% dry substance. The viscosity of the mass was about 80,000 mPas.

Candy No. 4(b), sweetened with xylitol in combination with Polydextrose A in a ratio of about 1:4 was boiled to a temperature of about 150° C. under atmospheric conditions and exhibited a considerable reduction in the viscosity as compared to Candy No. 4(a); the resulting mass could be handled without difficulty. Surprisingly, Candy No. 4(b) was neither hygroscopic nor prone to cold flow despite the fact that the candy was boiled to a mass comprising 96.5% weight percent of dry substance. Although the sweetness was perceived to be insufficient, the candy was observed to have excellent textural attributes and provided a caloric reduction of 60% compared with conventional hard candies. The xylitol content falls into the concentration range where cariostatic properties have been noted. Additionally, the presence of xylitol significantly reduced the viscosity and ease of handling of the cooled mass (non-measurable in Candy No. 2) to about 5200 mPas at similar cooling and solids conditions.

Candy No. 5, sweetened with xylitol in combination with Polydextrose A in a 1:2 ratio also exhibited good handling properties even at dry substance content of 99.3%. When compared to Candy No. 4(a), the presence of additional xylitol significantly reduced the viscosity below the computed expected value of at least about 53,000 mPas (80,000×0.67+74×0.33), and improved the handling properties of the cooled mass. Candy No. 5 provides a 50% reduction in calories compared to conventional hard candies and contained xylitol in the concentration range where cariostatic properties have been noted. However, the sweetness level was observed to be insufficient.

In Candy Nos. 6 and 7, aspartame was added (0.35% and 0.3% weight percent respectively) to increase the sweetness level. The lowering of the viscosity of the cooled mass caused by the presence of xylitol was observed to greatly facilitate the blending of the aspartame into the cooled mass. Candy Nos. 6 and 7 exhibit the dental, metabolic, technical and sensory attributes of a dietetic hard candy although Candy No. 7 was insufficiently stable.

Candy No. 8, sweetened with xylitol and hydrogenated glucose syrup in combination with Polydextrose A in a dry basis weight ratio of 20:36:44 produced a hard candy which was perceived to have acceptable sweetness and demonstrated good stability without the use of an intense sweetener. The addition of hydrogenated glucose syrup improved the acceptability of the hard candy. While easy to handle, the viscosity of the mass was nearly doubled when compared to Candy No. 5.

2. Sugar-Free Chewy Candies

Table II sets forth various chewy candy formulations sweetened with xylitol and hydrogenated glucose syrup in combination with Polydextrose A in varying ratios.

TABLE II

| SUGAR-FREE CHEWY CANDIES | | | | | |
|---|---|---|---|---|---|
| | Candy No. | | | | |
| | 1 | 2 | 3 | 4 | 5 |
| | % (By Weight) | | | | |
| Xylitol | 37.4 | 43.1 | 27.3 | 27.3 | 34.7 |
| Hydrogenated glucose syrup | — | — | 6.7 | 6.7 | 5.9 |
| Polydextrose A | 34.5 | 28.8 | 39.5 | 39.5 | 28.0 |
| Water | 13.0 | 13.0 | 13.1 | 12.98 | 8.9 |
| Gelatin 300° (Bloom) | 1.4 | 1.4 | 1.4 | 1.4 | 1.4 |
| Water | 2.8 | 2.8 | 2.8 | 2.8 | 2.8 |
| Vegetable fat | 5.0 | 5.0 | 5.0 | 5.0 | 8.0 |
| Glycerol monostearate | 0.6 | 0.6 | 0.6 | 0.6 | 0.7 |
| Xylitol fondant* | 5.0 | 5.0 | 5.0 | 5.0 | 9.3 |
| Citric acid | 0.3 | 0.3 | 0.3 | 0.3 | 0.3 |
| Color/flavor | qs | qs | qs | qs | qs |
| Aspartame | — | — | — | 0.12 | — |
| Sweetness | — | — | — | + | + |
| Hardness | ++ | — | + | + | + |
| Stickiness | NP | P | NP | NP | NP |

| Key | *Xylitol Fondant | |
|---|---|---|
| ++ - Excessive | | % |
| + - Sufficient | Ingredients | (Fresh Basis) |

TABLE II-continued
SUGAR-FREE CHEWY CANDIES

| | | Candy No. | | | |
|---|---|---|---|---|---|
| | | 1 | 2 | 3 | 4 | 5 |
| | | % (By Weight) | | | | |
| – – Insufficient | Xylitol | | | | 63.5 |
| P – Present | Sorbitol (70% solution) | | | | 20.0 |
| NP – Not present | Water | | | | 16.5 |
| qs – quantum sufficit | Procedure | | | | |

1. Boil ingredients to 135° C.
2. Cool to 35° C.
3. Beat at high speed for approximately 10 minutes.

Chewy Candy Nos. 1–4 were prepared by dissolving xylitol and a reduced calorie bulking agent (and an additional polyhydric alcohol, if used) in a sufficient quantity of water. The resulting solution was boiled to about 135° C. and then removed from the heat; vegetable fat and emulsifier were added. The resulting syrup was cooled to about 100° C. before adding a gelatin solution. The resulting mass was poured onto a cold table and the xylitol fondant, coloring, flavors, acidulants (and intense sweeteners if used) were kneaded into the mass. The mass was further cooled to about 25° C. and pulled for about 8 minutes and formed into ropes and shaped into the desired shapes.

Chewy Candy No. 5 was prepared as above except the combined ingredients xylitol, Polydextrose A and hydrogenated glucose syrup were heated to boiling (about 165° C.) prior to the addition of vegetable fat and cooled to about 138° C. The xylitol fondant, coloring, flavors and acidulants were kneaded into the mass. The pulled mass was allowed to stand overnight and was then subjected to high speed mixing in a heavy duty mixer (such as a Z-Fold Mixer) for a sufficient amount of time to disrupt the crystalline structure. Chewy Candy No. 5 exhibited superior shelf stability compared to Candy Nos. 1–4. The heavy duty mixing following the overnight crystallization allows the use of higher fondant levels and produces a chewy candy which does not harden under extended storage.

Chewy Candy No. 1, sweetened with xylitol in combination with polydextrose in a dry basis weight ratio of 52:48 produced an extremely hard candy which was difficult to chew. Chewy Candy #2 in which the xylitol to Polydextrose A ratio was, 60:40, respectively produced a softer, chewier candy. The increase in the xylitol, however lowered the viscosity of the candy and caused excessive stickiness. Chewy Candy No. 3, sweetened with xylitol and hydrogenated glucose syrup in combination with Polydextrose A in a dry basis weight ratio of 38:7:55 produced a candy with suitable texture (observed to be chewy but not sticky) but was perceived to lack sufficient sweetness. Chewy Candy No. 4 included the intense sweetener aspartame and was perceived to have sufficient sweetness and acceptable texture and stability. Chewy Candy No. 5, sweetened with xylitol and hydrogenated glucose syrup in combination with Polydextrose A (and prepared using the method specified above) was perceived to be sufficiently sweet and had an acceptable texture (chewy but not sticky). Chewy Candy No. 5 was, as noted, extremely shelf stable.

3. Sugar-Free Gelatin Jellies

Table III sets forth gelatin jelly formulations sweetened with xylitol and hydrogenated glucose syrup in combination with Polydextrose A in varying ratios. All formulations had good stability with respect to shrinkage and crystallization.

TABLE III
SUGAR-FREE GELATIN JELLIES

| | Candy No. | | | | |
|---|---|---|---|---|---|
| | 1 | 2 | 3 | 4 | 5 |
| | % (By Weight) | | | | |
| Xylitol | 7.4 | 6.5 | 21.9 | 21.9 | 33.0 |
| Hydrogenated glucose syrup | 14.8 | 51.8 | 15.0 | 15.0 | — |
| Polydextrose A | 51.8 | 6.5 | 31.5 | 31.5 | 32.0 |
| Water | 9.9 | 19.6 | 9.1 | 8.9 | 9.2 |
| Gelatin 250° (Bloom) | 5.9 | 5.2 | 7.3 | 7.3 | 8.4 |
| Water | 11.8 | 10.4 | 14.6 | 14.6 | 16.8 |
| Citric acid 50% solution | 0.4 | 0.8 | 0.6 | 0.6 | 0.6 |
| Color/flavor | qs | qs | qs | qs | qs |
| Aspartame | — | — | — | 0.2 | — |
| Boiling temperature (°C.) | 130 | 120 | 124 | 124 | 140 |
| Sweetness | — | + | — | + | + |
| Stability | + | + | + | + | + |
| Texture/Mouthfeel | — | — | + | + | + |

Key
+ - Sufficient
− - Insufficient
qs - quantum sufficit

The gelatin jellies set forth in Table III were prepared by dissolving the xylitol, reduced-calorie bulking agent and hydrogenated glucose syrup in a sufficient amount of water. The solution was heated to about 120° C. to about 140° C. and then cooled to about 90° C. before adding a gelatin solution. The colors, flavors and acidulants and aspartame in the case of Candy No. 4, were mixed in and the mass deposited into starch impressions.

The differences between the various sugar-free gelatin jellies set forth in Table III were in terms of perceived texture and sweetness. Candy Nos. 1 and 2 were perceived to have a tender texture but a slightly gummy mouthfeel. Candy No. 3 was perceived to have a good, firm texture, but was observed to have insufficient sweetness. Candy No. 4 was perceived to have a good, firm texture, but because of the presence of aspartame, was observed to have sufficient sweetness. Candy No. 5 was observed to have both acceptable texture and sufficient sweetness, but did so without the presence of an intense sweetener. Due to the presence of a reduced calorie bulking agent, namely Polydextrose A, Candy No. 5 provides a calorie reduction of about one third compared to a standard gelatin jelly and contains xylitol in a concentration sufficient to support a cariostatic claim.

4. Sugar-Free Praline Filling

Table IV sets forth formulations for a sugar-free praline filling sweetened with xylitol. The fillings were sweetened with xylitol, hydrogenated glucose syrup and cocoa fiber, with and without the presence of Polydextrose K. All of the formulations tested exhibited adequate sweetness, but varied in terms of perceived texture.

The praline fillings set forth in Table IV were prepared by dissolving xylitol and hydrogenated glucose syrup in a sufficient quantity of water and boiling to about 100° C. The dry ingredients were mixed into the boiled syrup and the melted fat and lecithin were mixed in.

TABLE IV

| SUGAR-FREE PRALINE FILLING | | | | |
|---|---|---|---|---|
| | \multicolumn{4}{c}{Candy No.} | | | |
| | 1 | 2 | 3 | 4 |
| | \multicolumn{4}{c}{% (By Weight)} | | | |
| Xylitol (milled) | 21.6 | 22.6 | 22.6 | 22.6 |
| Hydrogenated glucose syrup | 40.0 | 30.0 | 19.4 | 29.0 |
| Polydextrose K | — | — | 19.6 | 10.0 |
| Skimmed milk powder | 6.0 | 6.0 | 6.0 | 6.0 |
| Cocoa fibre | 20.0 | 29.0 | 20.0 | 20.0 |
| Cocoa powder | 2.0 | 2.0 | 2.0 | 2.0 |
| Vegetable fat (CBE) | 10.0 | 10.0 | 10.0 | 10.0 |
| Lecithin | 0.4 | 0.4 | 0.4 | 0.4 |
| Sweetness | + | + | + | + |
| Stickiness | P | NP | NP | NP |
| Hardness | + | + | ++ | + |

Key
++ - Excessive
+ - Sufficient
— - Insufficient
P - Present
NP - Not present

Formulation No. 1 was very sticky and consequently difficult to handle, although it stabilized after a few days of storage. Formulation No. 2, with additional cocoa fiber exhibited a lack of stickiness and a good texture. Formulation No. 3, which included Polydextrose K in addition to the cocoa powder was easier to handle but hardened to a great extent during storage. Formulation No. 4, which contained lesser amounts of Polydextrose K, was easier to handle and was perceived to have a good texture. Formulation Nos. 2 or 4 could be used to bind a mixture of nuts and cereal grains to form an acceptable granola bar with a short texture.

5. Sugar-Free Chocolate

Table V sets forth sugar-free chocolate formulations in which xylitol and Polydextrose K were evaluated at different ratios. The chocolates were prepared by melting the cocoa liquor and cocoa butter and combining and mixing with the sweetener blend and vanillin. The mix was then double refined to the required particle size. The refined mix is conched for 18 hours at 40° C. before adding the lecithin, tempering and molding in accordance with method well known in the art.

TABLE V

| SUGAR-FREE CHOCOLATE | | | | | |
|---|---|---|---|---|---|
| | \multicolumn{5}{c}{Candy No.} | | | | |
| | 1 | 2 | 3 | 4 | 5 |
| | \multicolumn{5}{c}{% (By Weight)} | | | | |
| Xylitol, crystalline | 46.5 | — | 23.5 | 32.5 | 37.0 |
| Polydextrose K | — | 46.5 | 23.0 | 14.0 | 9.5 |
| Cocoa liquor | 42.0 | 42.0 | 42.0 | 42.0 | 42.0 |
| Cocoa butter | 11.0 | 11.0 | 11.0 | 11.0 | 11.0 |
| Lecithin | 0.48 | 0.48 | 0.48 | 0.48 | 0.48 |
| Vanillin | 0.02 | 0.02 | 0.02 | 0.02 | 0.02 |
| Sweetness | + | — | ± | + | + |
| Burning aftertaste | P | N | N | N | N |
| Acidic aftertaste | N | P | N | N | N |

Key
+ - Sufficient
— - Insufficient
P - Present
N - Not Present

Chocolate No. 1 was sweetened entirely with xylitol and was observed to have acceptable sweetness; an undesirable burning aftertaste—attributable to xylitol—was detected at the back of the mouth. Chocolates Nos. 2 and 3 (containing 0% and 23.5% by dry weight of xylitol) respectively would be expected to have insufficient sweetness. The burning aftertaste perceived in Chocolate No. 1 would probably not be present in either formulation, but a slight acidic aftertaste, attributed to the Polydextrose K, would be perceived in both formulations.

Chocolate Nos. 4 and 5, containing xylitol and Polydextrose K in the ratios 80:20 and 70:30 respectively were judged to have sufficient sweetness and no objectionable aftertaste; the burning aftertaste perceived in No. 1 and the acidic aftertaste anticipated in Nos. 2 and 3 were not observed. Both formulations contained sufficient xylitol to be considered cariostatic.

The foregoing general discussion and experimental examples are intended to be illustrative of the present invention, and are not to be considered as limiting. Other variations within the spirit and scope of this invention are possible, and will present themselves to those skilled in the art.

We claim:

1. A reduced calorie, non-cariogenic sweetening composition for a cooked confection product, which retains stability after processing comprising xylitol and a reduced calorie bulking agent in a weight ratio of about 4 to about 0.05 based on the dry weight thereof.

2. The sweetening composition of claim 1 wherein said reduced calorie bulking agent is a polymer of glucose or maltose.

3. The sweetening composition of claim 1 wherein said bulking agent is a randomly bonded condensation polymer of dextrose.

4. The sweetening composition of claim 1 wherein said bulking agent is a polymer of fructose.

5. The sweetening composition of claim 1 wherein said bulking agent is plan fiber.

6. The sweetening composition of claim 5 wherein said plant fiber is taken from the group consisting of cocoa fiber, oat fiber, wheat fiber, sugar beet fiber or corn fiber.

7. The sweetening composition of claim 1 which additionally includes an intense sweetener.

8. The sweetening composition of claim 7 wherein said intense sweetener is a dipeptide sweetener.

9. The sweetening composition of claim 8 wherein said dipeptide sweetener is aspartame.

10. The sweetening composition of claim 9 wherein said xylitol and said aspartame are present in a weight ratio of about 85 to about 225 based on dry weights thereof.

11. The sweetening composition of claim 1 which includes an additional physiologically acceptable polyhydric alcohol, said xylitol and said additional polyhydric alcohol being present in a respective fresh weight ratio of about 0.4 to about 8.

12. The sweetening composition of claim 11 wherein said polyhydric alcohol is taken from the group consisting of isomalt, maltitol, hydrogenated glucose syrup, sorbitol and mannitol.

* * * * *